April 17, 1956 — E. H. HOWELL — 2,741,970
BASEBOARD HEATING SYSTEM
Filed April 27, 1953

INVENTOR.
Elton H. Howell
BY
Cook & Robinson
ATTORNEYS ns Patent Office
2,741,970
Patented Apr. 17, 1956

2,741,970
BASEBOARD HEATING SYSTEM
Elton H. Howell, Marysville, Wash.

Application April 27, 1953, Serial No. 351,139

2 Claims. (Cl. 98—40)

This invention relates to what are generally known in the industry to which they pertain as baseboard heating systems, and it has reference more particularly to baseboard heating systems that employ hot air as the heating medium and to certain improvements in the baseboard air ducts that are employed for the distribution of hot air within an area that is to be heated.

It is the principal object of the present invention to provide an improved air distributing duct whereby a substantially even distribution of heated air throughout the full length of the distributing duct system serving any particular area will be effected.

It is a further object of the invention to provide an air distributing duct of baseboard type that is air tight throughout the full length of its upper portion, thus to provide therein a continuous air storage reservoir in that portion in which the hot air, as received from the source of supply, will be caused to flow and become mixed and thus maintained at substantially the same even temperature throughout the length of the duct regardless of the spacing of the points of entry; and wherein the said duct is formed longitudinally along its bottom portion with a slot through which the heated air contained in the duct will be evenly discharged into the area to be heated.

It is also an object of the present invention to provide a duct of novel construction in respect to the provision of dampers for regulating the admittance of heated air thereto.

Further objects and advantages of the invention reside in the details of construction of the various parts constituting the air distributing duct, and in their combination as will hereinafter be fully described.

In accomplishing the above mentioned and other objects of the present invention, I have provided the improved details of construction, the preferred forms of which are illustrated in the accompanying drawings, wherein.

Figure 1:
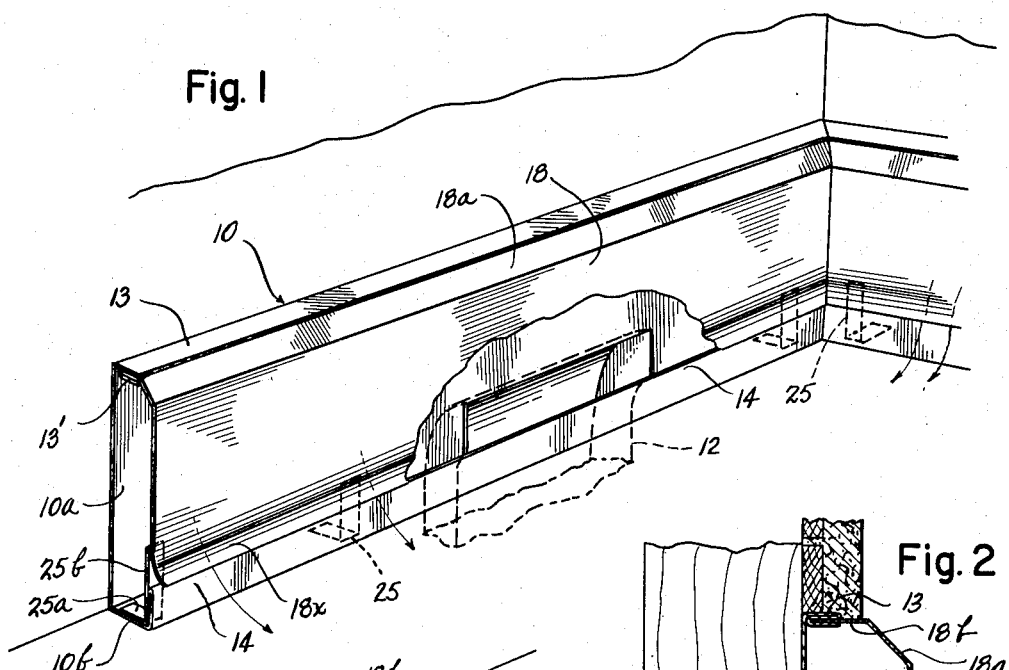
Fig. 1 is a perspective view showing a portion of a hot air distributing duct for a baseboard heating system and embodying the improvements of the present invention therein.
Figure 2:
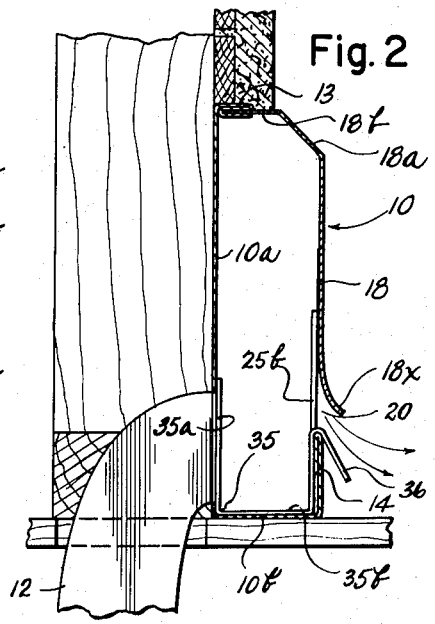
Fig. 2 is a somewhat enlarged cross-sectional view of the same, taken on line 2—2 in Fig. 1.

Referring more in detail to the drawings:

In the present heating system, I employ baseboard ducts for the distribution of hot air which are of the kind shown in Figs. 1 and 2. In its present preferred form of construction the distributing duct of this invention, designated in its entirety in Fig. 1 by numeral 10, is made up of tubular sections that may be joined end to end, to provide a continuous duct of any desired length. This distributing duct, preferably but not necessarily is made in those proportionate cross sectional dimensions in which it is shown in Fig. 2 and, as ordinarily used for residence heating purposes, would be approximately eight inches high and two inches wide. Heated air is supplied to the distributing duct through risers 12 leading from a supply duct or other suitable source of supply not herein shown. These risers may open into the distributing duct either through its bottom wall or through it back wall.

A preferred form of construction of the distributing duct 10 is shown in Fig. 2 wherein it is indicated as being formed from sheet metal, and to be substantially rectangular in cross section. The duct comprises a vertical back wall 10a and a horizontal bottom wall 10b that is integral with the back wall. Along its upper longitudinal edge the material of the back wall is bent forwardly at a right angle to form a sort of horizontal shelf 13 about one inch wide; the material of the shelf being turned downwardly and then directly inwardly, and then again turned downwardly and outwardly, thus forming a shelf of triple layer thickness. The two lower layers of this fold are slightly spaced to provide a narrow, outwardly opening channel 13' between them, as well shown in Figs. 2 and 3. Along its forward edge, the material of the bottom wall 10b is bent directly upward, and then turned inwardly and downwardly, providing a rigid, upstanding wall 14 of double thickness, about one inch high.

The front and top of the duct 10 are closed by a wall plate 18. This plate has its upper edge portion 18a bent inwardly and upwardly at about a 45° angle, and this terminates in a longitudinal edge portion 18b, turned horizontally and fitted within the channel 13' formed in that shelf portion that is integral with the back wall member 10a.

The lower longitudinal edge portion of the wall plate 18 is curved gradually outwardly as at 18x, thus to provide a continuous slot 20 for the discharge of hot air from the duct 10. The lower edge of the out-turned portion 10x terminates at about the same level as the top edge of the wall portion 14 but is outwardly offset therefrom. Thus hot air that is forced from the duct 10 through slot 20 will be discharged in a downward direction as indicated by the arrows adjacent the slot 20 in Fig. 2.

To insure a desired amount of rigidity to the front wall 18, I apply brackets 25 within the duct to brace the front wall. Each of these brackets has a horizontal leg 25a and a vertical leg portion 25b extended across the slot 20 and fixed to the lower edge portion of wall 18. The brackets are spaced at intervals of two to three feet as may be desired or required and are fixed to the bottom wall.

Figure 3:
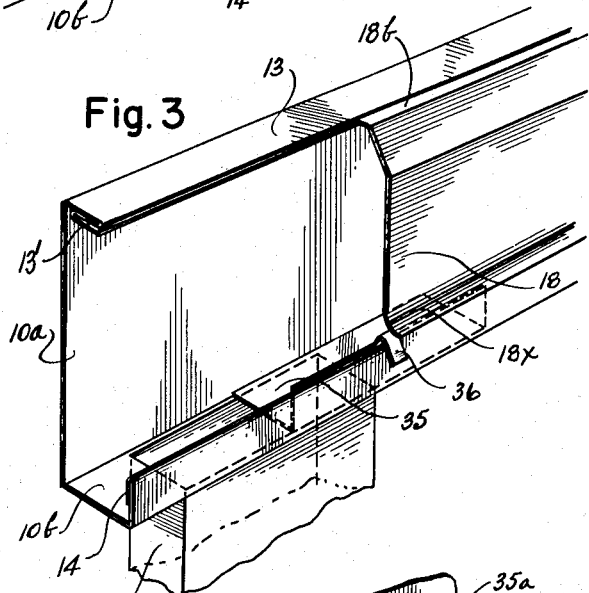
Fig. 3 is a perspective view of a part of an air distributing duct illustrating the provision of a damper therein for regulating the size of the discharge opening from an air supply duct that opens thereinto.
Figure 4:
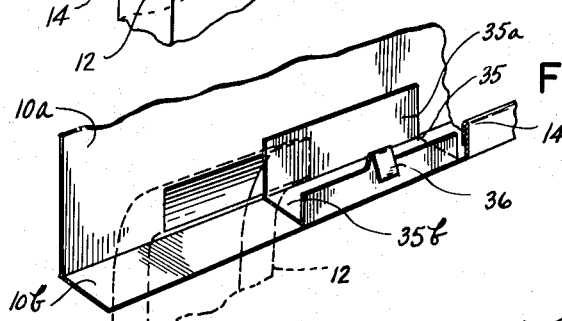
Fig. 4 is a similar view of a portion of an air duct showing the damper as applied to the discharge opening of an air supply duct that enters the distributing duct through the back wall thereof.

The risers 12 that deliver hot air to the duct 10 may enter through the back wall 10a of the duct, as shown in Fig. 2, or through the bottom wall 10b as shown in Fig. 3. These supply ducts, or risers, are about 2" x 14" in cross section, and would be spaced along the distributing ducts about six to ten feet apart, according to requirements.

It is also an object of this invention to provide dampers for regulating the delivery of hot air to the distributing ducts. In the event that the riser ducts 12 enter the ducts 10 through the back walls thereof, as shown in Fig. 2, the damper will comprise a sheet metal plate 35 bent to right angular form and disposed within the bottom of the air distributing duct, as seen in Fig. 2. The plate 35 has a length slightly greater than the discharge end of the supply duct and has a vertical flange 35a disposed flatly against the back wall 10b of the duct, and a horizontal flange 35b resting slidably and flatly on the bottom 10b of the duct. At its forward edge, the part 35b has a tongue 36 extending upwardly therefrom and then bent outwardly and downwardly, and extended through the discharge slot 20 to an accessible position for using it as a means for manually sliding the damper plate 35a in the duct 10 over or from the discharge end of the air supply duct 12.

In the event that the supply duct 12 enters the duct 10 through its bottom wall, as in Fig. 3, then the damper construction would be like that seen in Fig. 3 which discloses it to be a plate like that of the damper shown in Fig. 2, without the upstanding flange 35a. In either case, the effective size of the discharge opening from the supply duct is regulated by a sliding adjustment thereover of the damper plate associated therewith; this adjustment being accomplished by means of the part 36.

Ducts of the present character when applied to walls, as seen in Figs. 1 and 2 are ornamental in appearance; do not protrude to any appreciable or objectionable extent into the room, and do not catch or retain dust. Hot air that is discharged into the duct 10 from the supply ducts or risers 12 will be caused to flow along the ducts from end to end, and it is only after the duct is filled with hot air that it will be discharged through slot 10. In this way the pressure is equalized along the full length of the duct 10 and the discharged air is expelled with equal force at all points along the slot 20.

Such ducts are simple in construction, easy to assemble, relatively inexpensive and highly satisfactory for their intended use.

Having thus described my invention, what I claim as new therein, and desire to secure by Letters Patent, is:

1. In a baseboard heating system comprising a horizontally extending tubular hot air distributing duct of uniform dimensions throughout its length, said duct comprising a back wall, a front wall, a top wall and a bottom wall, hot air supply ducts spaced along and opening into the said distributing duct through a wall thereof, a substantially continuous air discharge slot formed in the front wall of the duct and opening therefrom into the area to be heated; said slot being located closely adjacent the bottom of the duct and the material of the front wall above the slot being bent out to effect the discharge of air through the slot in a downward direction, front wall supporting means spaced along the front wall and joined thereto at their upper ends and seated on the bottom wall at their lower ends, dampers slidably contained in the duct, each comprising metal plates bent to angular form and including a bottom portion and side portions with the bottom extending along and slidable on the bottom of the duct and the side portions extending vertically from the bottom portion, a tongue extended from the damper plate through said longitudinal slot as a means for the manual adjustment of the damper over and from the hot air supply ducts.

2. A distributing duct as recited in claim 1 wherein the back and bottom wall are integrally formed and said back wall being formed along its top edge with a forwardly directed portion defining a forwardly opening channel and wherein said bottom wall has an upturned flange along its forward edge, and said front wall having the top edge portion thereof turned inwardly, and fitted in said channel.

References Cited in the file of this patent

UNITED STATES PATENTS

| | | |
|---|---|---|
| 2,027,097 | Hanson | Jan. 7, 1936 |
| 2,181,747 | Simoneau | Nov. 28, 1939 |
| 2,206,119 | Persons | July 2, 1940 |
| 2,237,831 | Jones | Apr. 8, 1941 |
| 2,250,330 | Eastwood et al. | July 22, 1941 |
| 2,291,220 | Germonprez | July 28, 1942 |
| 2,395,233 | Richardson | Feb. 19, 1946 |
| 2,639,655 | Whitehead | May 26, 1953 |

FOREIGN PATENTS

| | | |
|---|---|---|
| 525,222 | Great Britain | Aug. 23, 1940 |
| 705,062 | Germany | Apr. 16, 1941 |